(12) United States Patent
Grosvenor (10) Patent No.: US 7,873,258 B2
(45) Date of Patent: Jan. 18, 2011

(54) METHOD AND APPARATUS FOR REVIEWING VIDEO

(75) Inventor: David Arthur Grosvenor, Frampton Cotterell (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1946 days.

(21) Appl. No.: 10/894,617

(22) Filed: Jul. 20, 2004

(65) Prior Publication Data
US 2005/0031296 A1    Feb. 10, 2005

(30) Foreign Application Priority Data
Jul. 24, 2003    (GB)    .................................. 0317317.6

(51) Int. Cl.
*H04N 5/91* (2006.01)
*H04N 7/00* (2006.01)

(52) U.S. Cl. ................................. 386/46; 386/4; 386/52
(58) Field of Classification Search ...................... 386/4, 386/46, 52
See application file for complete search history.

(56) References Cited

U.S. PATENT DOCUMENTS

| 5,218,672 A | * | 6/1993 | Morgan et al. ............... 345/501 |
| 5,331,417 A | | 7/1994 | Soohoo |
| 5,448,315 A | | 9/1995 | Soohoo |
| 6,154,601 A | | 11/2000 | Yaegashi et al. |

FOREIGN PATENT DOCUMENTS

| EP | 0843311 A2 | 5/1998 |
| JP | 07169247 A * | 7/1995 |

\* cited by examiner

*Primary Examiner*—Thai Tran
*Assistant Examiner*—Girumsew Wendmagegn (57) ABSTRACT

One embodiment is a method for reviewing videos, comprising: deriving at least two video segments from unedited video footage based upon a previously determined unique saliency, each saliency associated with a corresponding one of the video segments; and displaying a display window for each of the derived video segments substantially concurrently.

45 Claims, 6 Drawing Sheets

METHOD AND APPARATUS FOR REVIEWING VIDEO

TECHNICAL FIELD

Embodiments are generally related to image capture devices and, more particularly, is related to a system and method for reviewing video footage.

CLAIM TO PRIORITY

This application claims priority to copending United Kingdom utility application entitled, "A Method and Apparatus for Reviewing Video," having serial No. GB 0317317.6, filed Jul. 24, 2003, which is entirely incorporated herein by reference.

BACKGROUND

Video footage captured by a wearable video camera provides a continuous, unedited, record of the wearer's experiences in anticipation of capturing memorable or interesting events which it may be desired to review later. However, since the wearable camera may capture many hours of continuous footage, it is a time consuming process to review the footage later in order to find the interesting events.

The review and/or editing of previously unedited footage is quite different from reviewing pre-edited or published material such as a movie distributed on a DVD-video disk. A finished product such as a DVD movie presents the footage in an edited and readily-reviewable format whereas unedited footage may be many hours in length with no easy means of identifying events of interest.

Straight playback and review in real time of the video captured is a certain but laborious way of finding the interesting events. It is advantageous in that the wearer of the camera can themselves perform the review as they will most effectively identify the interesting events. The disadvantage is that it takes at least as long to review the video as the experience itself which was recorded. Straight playback faster than real time means that the audio track cannot be simultaneously reviewed and important events relating to the audio track may be missed.

Video summarisation is a known process in which continuous footage is summarised into a short video summary, maintaining a sense of the "story". Key frames (i.e. stills "markers") are identified and then short segments based around each stills marker are put together to make a continuous short video summary of the whole footage. Key frames on their own should provide a fast review mechanism, however with continuous video footage, such as from a wearable camera, the key frames may well be very similar to one another. If this is the case then one can only distinguish the key frames by looking at the video itself since the key frame does not provide a good clue as to what will happen in the video clip or segment.

Furthermore, if the key frames are automatically selected, human input in deciding what should be considered interesting will be absent. An automatically generated video summarisation may be fast, but may miss more subtle interesting moments or, at the other extreme, return too many false alarms. The decision as to what is interesting should ideally be made by a person, and preferably the wearer of the video camera which captured the footage, as their sense of familiarity with the footage brings significant input to the effectiveness of the review.

U.S. Pat. No. 5,805,733 (Wang) describes a method and system of summarising scenes in a video sequence by detecting scene changes and then comparing scenes in a moving window to determine their similarity. Similar scenes are consolidated and represented by a representative frame. Multiple representative frames are displayed to the user who can then select which set of consolidated related scenes to view. This method may be difficult to apply to footage obtained from a wearable camera, where there may be no distinct scene changes.

It is therefore an object of the invention to provide a method and apparatus for reviewing video, which seeks to alleviate the above mentioned disadvantages.

SUMMARY

The user assistance system provides a system and method for reviewing videos. Briefly described, one embodiment is a method comprising: deriving at least two video segments from unedited video footage based upon a previously determined unique saliency, each saliency associated with a corresponding one of the video segments; and displaying a display window for each of the derived video segments substantially concurrently Another embodiment is a method comprising: deriving a plurality of video segments from unedited video footage based upon a previously determined unique saliency, each saliency associated with a corresponding one of the video segments; deriving a display window for each of the derived video segments; and displaying the display windows substantially concurrently on at least one display, wherein locations of each of the display windows on the display corresponds to a temporal relationship between the video segments.

Yet another embodiment is a system for reviewing unedited video footage, comprising: a processor configured to process the unedited video footage using at least one saliency metric, configured to derive a plurality of video segments from the processed video footage, and configured to generate data for displaying the video segments as a display window; a memory from which the unedited video footage is stored for access by the processor; and a display configured to substantially concurrently display the display windows.

BRIEF DESCRIPTION OF THE DRAWINGS

The components in the drawings are not necessarily to scale relative to each other. Like reference numerals designate corresponding parts throughout the several views, in which.

DETAILED DESCRIPTION

Throughout this description:

"the wearer" means the person who was wearing the video camera, in a weareable embodiment, which captured the continuous video footage, also referred to interchangeably herein as footage, it is desired to review;

"video data" means at least one of visual data, audio data or other sensory data derivable from the captured footage;

"displaying video data" in relation to non-visual data such as audio or other sensory data, means outputting such data, such as to a display or the like;

"metadata" means data about the video data, for example, but not limited to, data relating to location, time and date etc.;

"computer program element" means at least part of and, optionally, the whole of a computer program; and "saliency" means a level of interest in the footage based on factors such as, for example, movement, composition, contrast etc.

Initially, it is necessary to capture the continuous video footage it is desired to review with a suitable image capture device and/or retrieve the footage from memory. The capture of the video footage is outside the scope of this invention, but in one situation may result from a wearable video camera which captures several hours of continuous footage. The camera could simply be carried rather than being head-mounted or otherwise wearable. The footage could, optionally, be captured by more than one camera, for example by a small group of people, each having a wearable camera so as to capture each person's respective point of view of events or scenes.

Such continuous footage is typically largely uneventful, interspersed with events of interest which it is desirable to locate upon review of the footage. The events of interest may be located in the visual data, in the audio data, in other sensory information or any combination thereof.

Various embodiments of the present invention are based upon the concept that it is desirable to use human input in reviewing such video footage. The prior art automatic systems do not take account of the wearer's participation in and familiarity with events recorded on the video footage. This familiarity can be exploited to help select the interesting events and to speed up the review process. However, even if the user of the video reviewing method and apparatus described herein is not the wearer, it may be nevertheless advantageous to have human input to the reviewing process.

Figure 1:
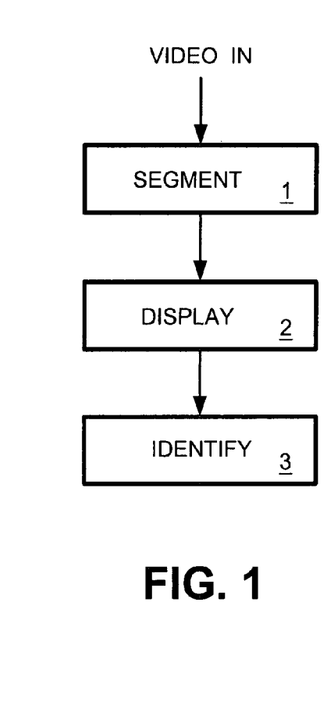
FIG. 1 is a block diagram showing the basic method steps of a preferred embodiment of the invention.

FIG. 1 is a block diagram of an embodiment showing an exemplary method of a process for reviewing video footage. Continuous video footage is divided, at the segmentation stage (1), into a plurality of video segments. Once the video segments have been derived from the video footage, each segment is displayed (2), substantially concurrently, in a display window. There are a plurality of display windows available per video segment so that video segments can be played substantially concurrently and simultaneously be viewed by a user. As an alternative to a plurality of display windows on a single monitor or screen, each video segment may be displayed on a separate monitor or screen, so long as the monitors or screens are capable of being viewed simultaneously. Video data of interest can then be readily identified (3), for example by direct selection, by a user.

The process achieves display for effective review of the video data. The result of this review is most generally an annotated version of the original video, which is more useful for a subsequent reviewer and which is particularly useful for any subsequent editing process (to create new video, or stills, by removing or reordering (or both) content from the original video). It is possible in some embodiments that editing steps are carried out during this review, in which case the output may be a new edited video, or a set of annotated video segments and/or stills which can again subsequently be further edited. While the editing process may be substantially assisted by use of such annotated content (key steps such as searching may be achieved much more easily), it should be noted that conventional editing processes may be employed with such content and that editing processes as such are outside the scope of this invention.

Figure 2:
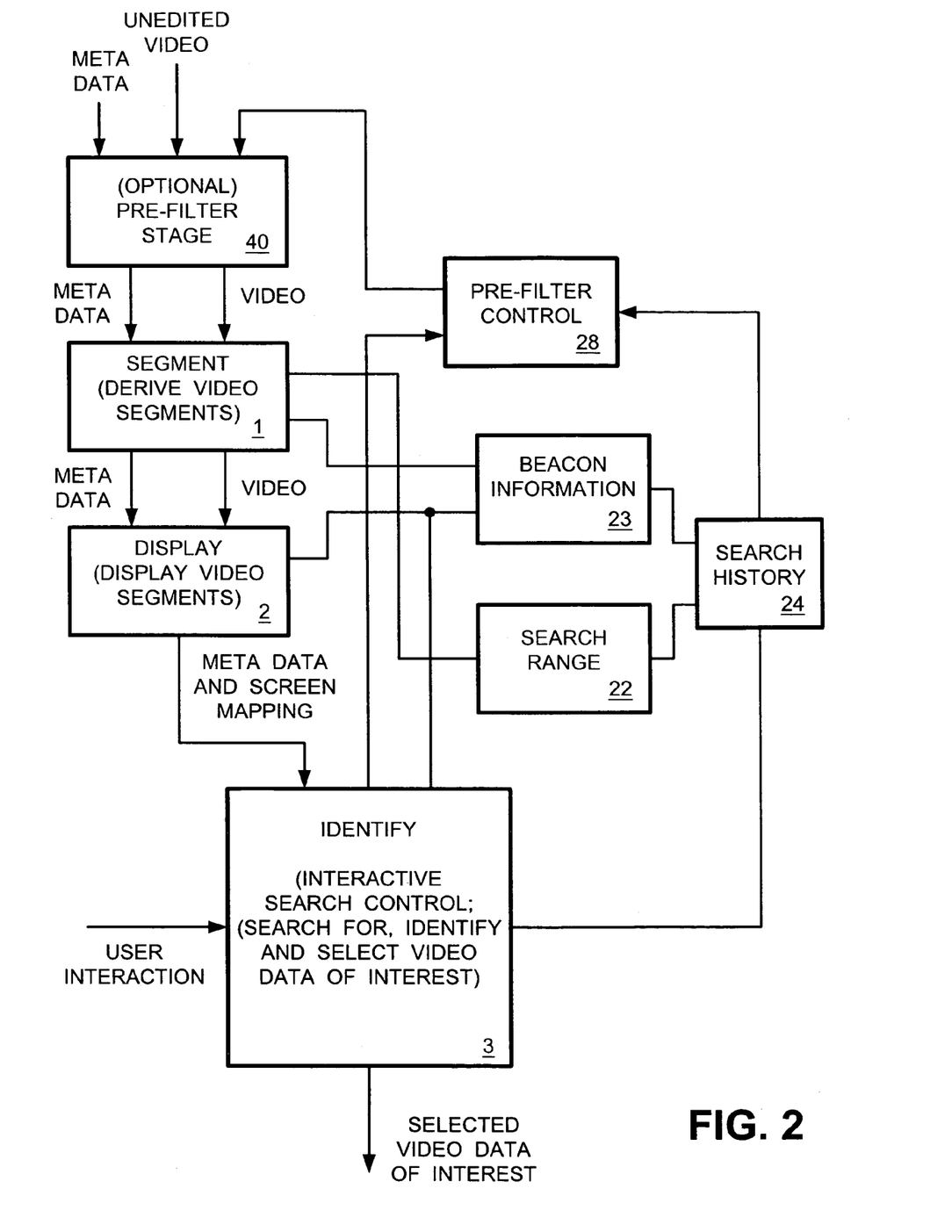
FIG. 2 is a block diagram showing further detail of the method steps of FIG. 1.

FIG. 2 shows further detail of the process for reviewing video footage used by an exemplary embodiment. With this embodiment, unedited video footage and corresponding meta data (for example, but not limited to, data relating to the location at which the footage was obtained) are optionally pre-filtered in a pre-filter stage 40, by search range 22, by beacon information 24, search history 26 and pre-filter control 28, which is described below with reference to FIG. 3.

Figure 3:
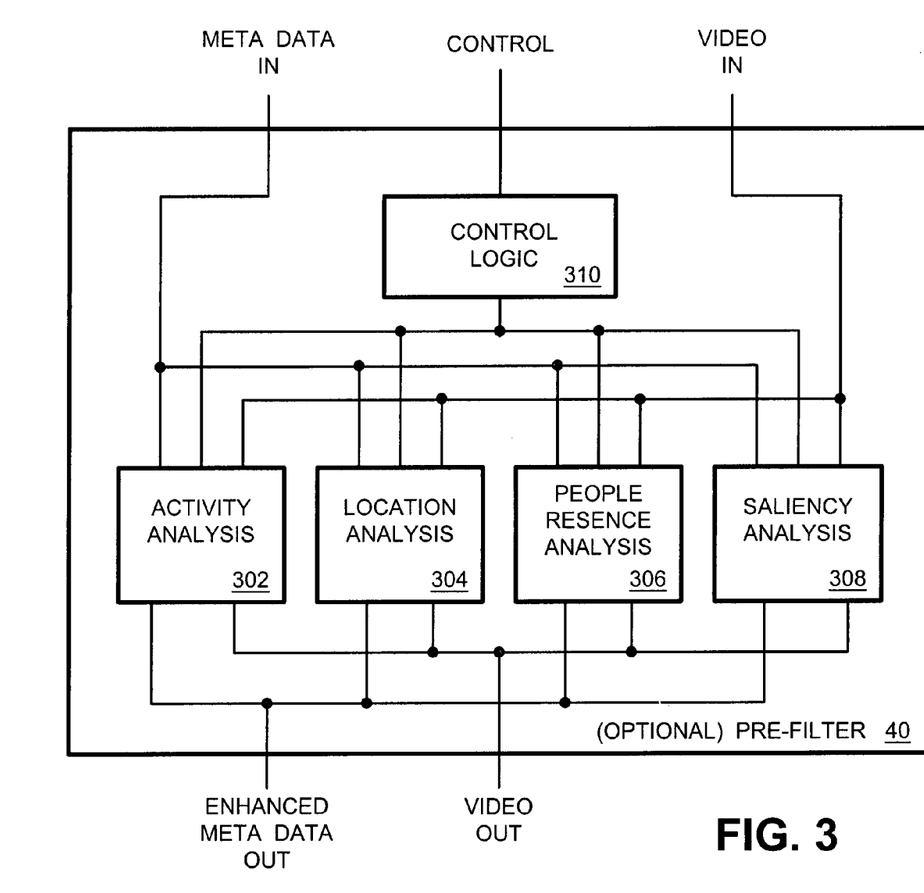
FIG. 3 is a block diagram showing further detail of the optional pre-filter stage.

Referring now to FIG. 3, detail of the optional pre-filter stage 40 is shown. This pre-filter stage 40 enables input unedited video and meta data to be processed in order to reduce the quantity of video data potentially available to the segmentation and display stages and to improve the quality of the meta data which accompanies the video data. This may be achieved by processing according to numerous available selection criteria.

For example, data associated with a particular location (location analysis 302) may be selected and all other data discarded (or vice versa). The data may be processed using a saliency metric so that all data except that meeting a certain saliency threshold may be discarded. Data satisfying the relevant selection criteria can then be concatenated and passed to the segmentation stage 1 (see also FIG. 1).

Various exemplary selection criteria are indicated in FIG. 3, where analysis by activity (of the wearer e.g. running, cycling etc) (activity analysis 302), location (location analysis 304), people present (people presence analysis 306), and/or other saliency measures (saliency analysis 308) can be performed by control logic 310.

After optional pre-filtering, video, and meta data if available, the segmentation stage 1 where a plurality of video segments are derived from the video footage, using the associated relevant meta data. In one embodiment, the segments are equal in length, but may not necessarily be so. In another or the same embodiment, the footage may be actually divided in order to derive the video segments or a number of markers or pointers (hereinafter called "beacons") used to define the start positions of each of the video segments in the continuous (undivided) footage.

In other embodiments, the video footage may be simply divided chronologically into segments of equal length, using no other criteria. Alternatively, the footage could be divided according to which of several cameras captured it.

Alternatively or in addition, the video footage may be processed using a saliency metric so that events having saliency above a predefined saliency threshold are identified ("salient events"). Then the video footage is divided into segments, each centred around a salient event. In this case, the video segments may not be of equal length. A suitable apparatus and method for saliency processing is described in our copending UK patent application entitled "Use of Saliency in Media Editing" (ref. 300200168-1 Cheatle et al) incorporated by reference and filed concurrently in Great Britain with the priority application GB 0317306.9, filed on Jul. 24, 2003.

Once the video segments have been derived from the video footage, each segment is displayed 2 (FIG. 1), substantially concurrently in some embodiments, in a display window. The display stage 2 is also responsible for indicating whether what is being displayed is a beacon, and for displaying available labels, for example, but not limited to, location information, identifying people present, and/or indication of the camera wearer's activity (walking, cycling, sitting etc.), depending upon the particular. embodiment. This information is usually derived from the meta data either originally input or deduced during the optional pre-filter process. Upon viewing the concurrently displayed video segments, the user can interactively control a searching process and identify data of interest 3. Further details of the interactive search control 3 are shown in FIG. 4.

Figure 4:
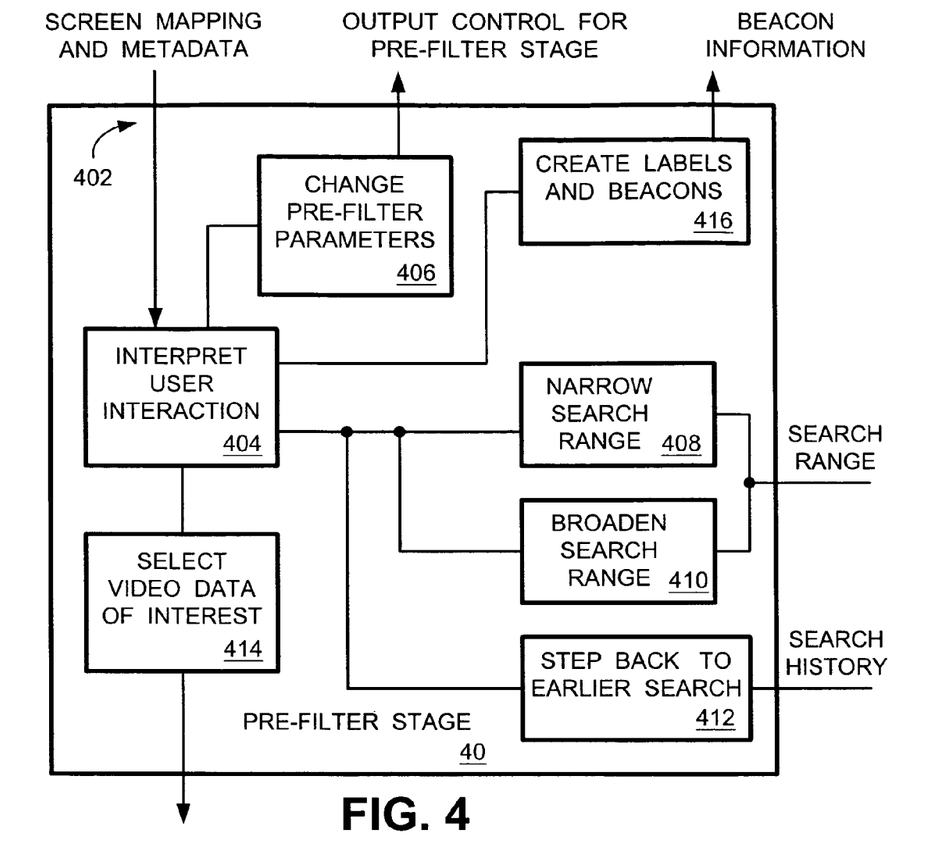
FIG. 4 is a block diagram showing further detail of the interactive search control stage.

Referring to FIG. 4, the interactive search control receives screen mapping information and/or meta data 402 from the display stage 3 (FIGS. 1 and 3) and uses this to interpret the user's interactive input 404. The interactive search control enables the user to:

change the parameters 406 of the optional pre-filter stage, for example to go back to footage previously discarded;

change the parameters which determine how the video segments are derived;

create beacons and labels;

narrow the search range 408;

broaden the search range 410;

access the search history to enable the user to "go back" to a previous search 412; and/or select video data of interest 414.

The above list is given by way of example only and other features and facilities are envisaged.

Figure 5:
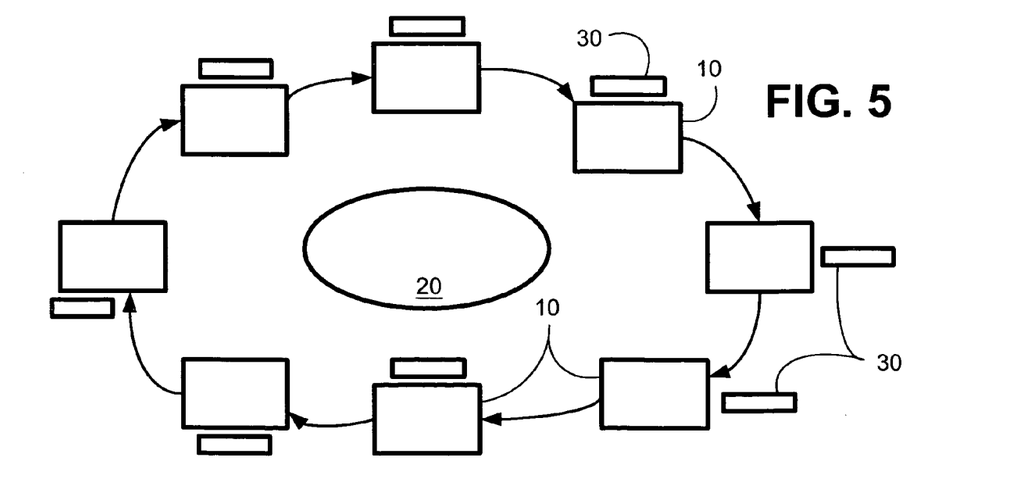
FIG. 5 is a schematic view of an embodiment of the plurality of display windows.

An exemplary arrangement of display windows 10 is shown in FIG. 5. The display windows are arranged around a simulated clock face 20 so as to suggest a sense of relative time to the user. The arrangement need not reflect real time, but the clockwise direction indicates a forward progression of time from one video segment to the next. In one embodiment, each window 10 is provided with a label 30 which indicates the actual time the footage displayed therein was obtained. Alternatively, or in addition, the spacing of the windows 10 around the clock face 20 could indicate the temporal separation between the video segments corresponding to the windows 10.

The labels 30, in other embodiments, could also be used to indicate other attributes of the video segments. These attributes may include location, activity, persons appearing in the video segment and/or the like. The labels 30 may be generated automatically using GPS, facial recognition software, etc., as appropriate and are derived from the meta data accompanying each video segment, depending upon the particular embodiment employed The video segments are simultaneously viewable by the user so that he/she can rapidly identify video data of interest, corresponding to at least one of the video segments, for further investigation. In some embodiments, video segments loop until video data of interest has been identified. The video data of interest may be identified, in an alternative embodiment for example, by the user clicking a mouse on the display window 10 concerned, which causes a further set of video segments to be derived from the video segment currently being displayed in that window 10. The further set of video segments are then displayed substantially concurrently in the display windows 10. The process can be repeated several times until the precise video data of interest (corresponding to a particular event) is identified. By way of contrast to known DVD movies, for example, where every possible available menu screen showing the edited footage is known (and processed) in advance, the embodiments described herein allows a user to perform ad hoc searches on extensive unedited footage. This type of interactive search allows a user to select any part of the unedited footage, from which a plurality of video segments can be created and displayed concurrently on windows 10 to facilitate further review.

Selection of video footage can take place in a number of ways, which can be employed separately, or together, in different embodiments. In some embodiments, the user may be able to annotate segments of video with "beacons" to indicate the start and end points of segments of interest and/or points (stills) of interest. In this way, segments and stills within the footage can be identified without removing them from the footage as a whole. In addition both stills and segments could be annotated with "labels" 30 in order to provide descriptive indicators of particular attributes—this will most typically be a user process (with user generated descriptive labelling of passages within the video, or possibly individual stills) to provide semantic reminders to the user or explanatory description to another viewer of the annotated video, though it should be appreciated that some forms of labelling (such as identification of speech, or of the presence of a particular person or object) may be carried out automatically, or carried out automatically if this is requested by a user.

Review of the video segments in this way enables, ultimately, an annotated version of the video footage to be created which facilitate any subsequent editing process. In particular, with various embodiments, it may also be possible for the video footage to be edited during this review and/or annotation process, to create edited footage (with content excised or reordered or both), to create video excerpts, to create stills, and/or all or any of the above. In some embodiments, however, the review stage precedes editing, which may be carried out by conventional video editing processes (which will benefit from being able to use annotated content, as procedures such as searching will be made much easier).

In order to facilitate the location of a particular event, in some embodiments, the user may be able to cause the video segments to index forward or back chronologically by a predetermined time period. For example, he/she could index all of the currently displayed video segments forward simultaneously in, for example, ten-minute steps to enable him/her to more rapidly identify the location of a key event.

The more display windows 10 and/or indexing facilities that are available, the easier it will be for the user to find an event he/she recognises which can be used to help provide a reference point for finding a particular event of interest. Once the user knows the event of interest is before or after such a reference point, it becomes possible to refine the time interval over which he/she is searching. The user could alternatively perform a bracketing operation on the displayed video segments i.e. by identifying that the event he/she is looking for is occurred "before video segment X but after video segment Y". A further set of video segments could then be derived from the footage available between the start of video segment X and the end of video segment Y so that the time interval over which the user is searching can be further refined.

Figure 7:
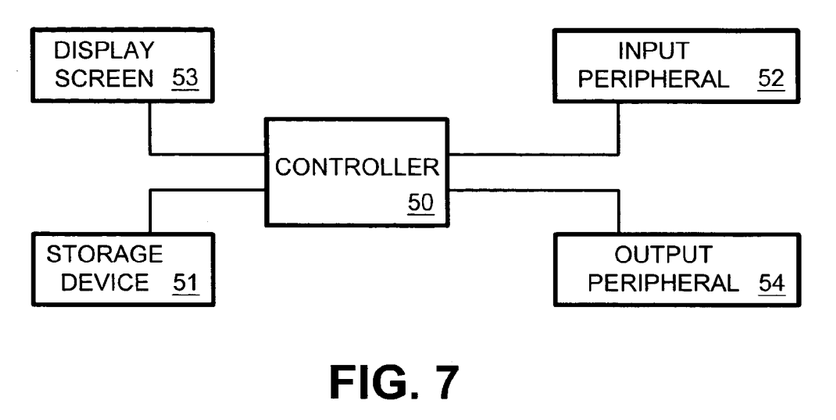
FIG. 7 is a block diagram of apparatus suitable for performing the method steps of a preferred embodiment of the invention.

In alternative embodiments, in addition to chronological indexing, it is also possible to provide a feature whereby the video segments are concurrently played in a fast forward mode. Depending upon the embodiment, the rate at which the video segments are played can be controlled by the user and/or by the controller 50 (FIG. 7). The video segments need not all be played at the same rate. It may be desirable to be able to independently control them so that, for example, one video segment may be paused (perhaps at a previously identified marker) whilst the other video segments continue to be played.

In some embodiments, alternatively or in addition to chronological indexing, the review can be facilitated using saliency metrics. Instead of deriving the video segments purely chronologically from the video footage, a pre-processing step can be performed (in the pre-filter stage 40) on the video footage in order to identify events having a saliency above a predefined saliency threshold ("salient events" as denoted by 602 in FIG. 6). These salient events 602 can be used as beacons which are used in deriving the video segments. For example, the video segments may each be centred around a salient event, or video segments may be derived in such a way that each segment contains an approximately equal number of salient events, regardless of the actual duration of each video segment. The sensitivity of the saliency threshold 604 can be set according to the approximate number of events it is desired to define as "salient".

Figure 6:
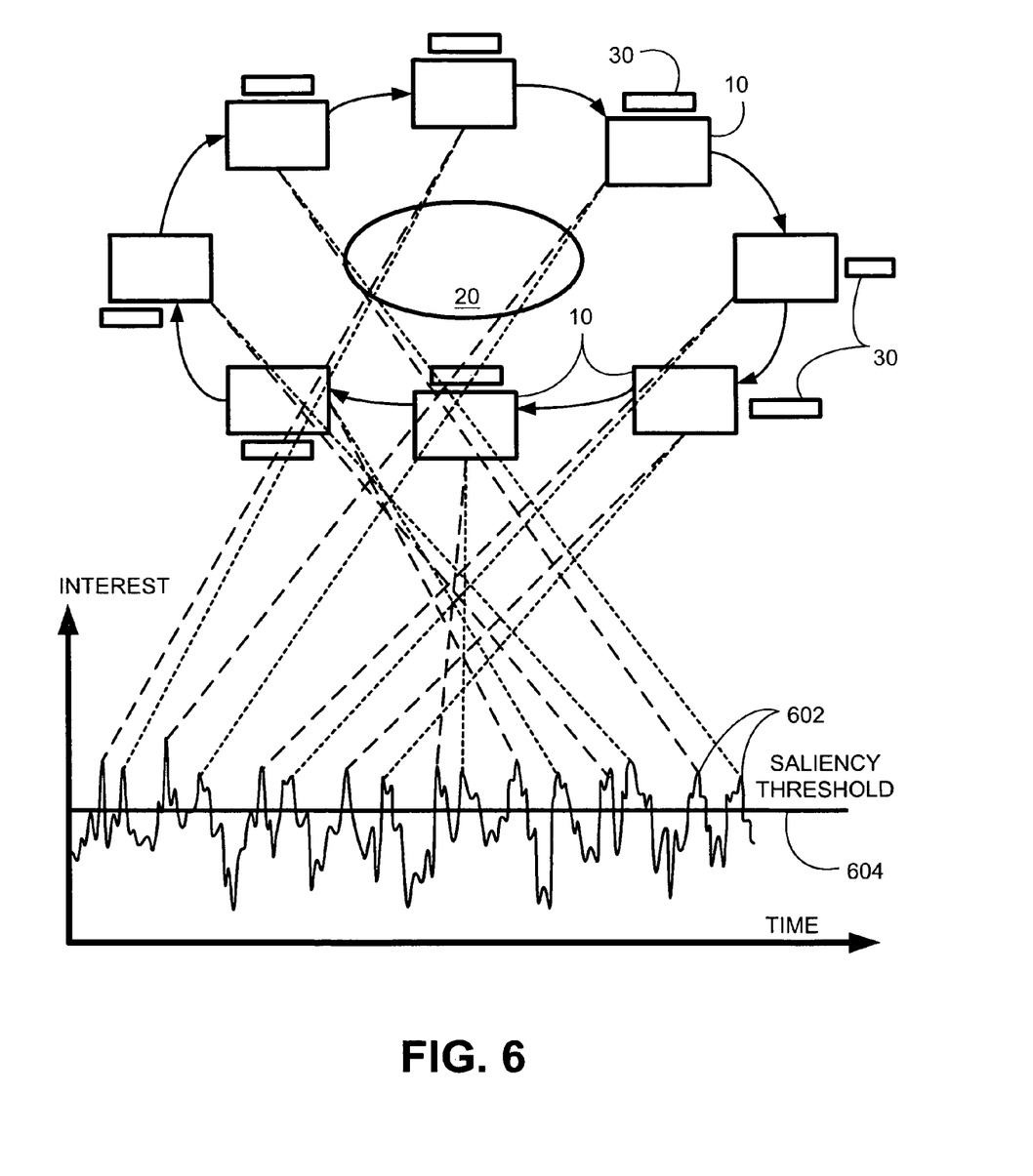
FIG. 6 is a schematic view of the display windows of FIG. 5 associated with a saliency measure.

Once such salient events have been defined, it is possible to index forward or back through the salient events in the video segments, in addition or alternatively to the chronological indexing described above. FIG. 6 shows how a user can step forward from salient events 602 currently displayed (dashed lines in FIG. 6) to the next salient events 602 (solid lines).

In some embodiments described herein allow the user to create labels and/or beacons 416 (FIG. 4) at any part of the unedited footage, to facilitate subsequent searches over the same part of the footage, referred to herein as beacon information.

Figure 8:
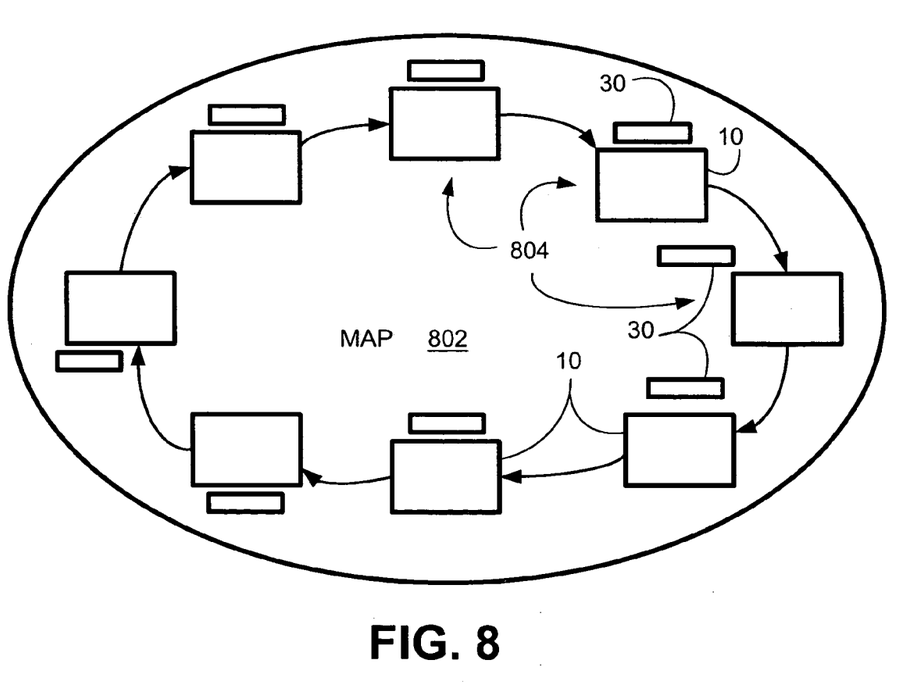
FIG. 8 is a schematic view of an alternative embodiment of the plurality of display windows displayed on a map.

As an alternative to arranging the display windows around a simulated clock face 20 (FIG. 5), the display windows 10 (and labels 10 if available or desirable) could be grouped by geographical location. In some embodiments, for example as illustrated in FIG. 8, display windows 10 may be displayed by being positioned on a map 802 representing the various locations 804 at which the video footage was captured. The video segments could be derived from the video footage according to location and each segment could then be displayed substantially concurrently on the display window 10 associated with the relevant location. The grouping of the display windows 10 by location could enable an initial review and selection of the video segments to be performed, before grouping the windows chronologically and further reviewing the video segments as described above.

In some embodiments, another factor by which the video segments could be grouped is available where the unedited video footage has been captured by more than one camera. A group of cameras potentially provides more than one view of the same event or experience, giving more footage which can be searched. The unedited footage may be pre-filtered, at the optional pre-filter stage 40 wherein the selection parameter is the identification of which of a group of cameras captured it.

In addition, in some embodiments, the video segments can be displayed so that a view from each one of a group of cameras is concurrently displayed. Alternatively, a plurality of video segments from just one camera may be concurrently displayed, but with the option being available of switching to another camera's view of the same event. Typically, if the reviewer of the footage was one of the camera wearers, he is likely to concentrate his searching on the footage from his own camera (as his recall of the events captured from his point of view will be best). However, once beacons have been created, or video data of interest identified, he may wish to switch to a view from one of the other cameras. This is possible if the timelines of the footage from each camera have been synchronised.

Whilst references above to "video data" include audio data, it may be desirable in some embodiments to have the audio data under independent control by the user. For example, sounds relating to all of the concurrently displayed video segments could be blended together and the blend could be varied by the user. In this way, the user could select which audio data to hear by placing a mouse over the relevant display window, audio data relating to the other display windows being temporarily suppressed.

In such embodiments, the audio data could be driven by either visual or auditory saliency. In other words, the sound which is played at any moment might be used to draw attention to a particular display window. If suitable audio output peripherals are utilised (see below) it is possible to make the sound appear to come from a particular display window or spatial position, so that a spatial auditory cue is given to the user.

In some embodiments, the audio data may also be played in fast forward mode (see description above). Normally, audio is suppressed during a fast forward mode as it becomes unintelligible. However, if the audio data is saliency driven, salient parts of the audio may be played at an intelligible rate, perhaps unsynchronised with the video. Audio played in this way may draw attention to a particular display window or provide more context to what is being displayed.

Referring to FIG. 7, suitable apparatus for performing the method steps of a preferred embodiment of the invention is illustrated. A computing device or controller 50 is provided which is capable of reading stored video data from a storage device 51. The controller 50 is capable of processing video data from the storage device 51 in response to user input via an input peripheral 52 (for example, but not limited to, a mouse or joystick). Processed and unprocessed video data can be displayed on a display screen 53 which includes multiple display windows 10 (FIG. 5 or 8). Audio data can be mixed or blended from multiple sources by the controller 50 and output to an output peripheral 54 (for example, but not limited to, loudspeakers or headphones which are capable of reproducing a spatial auditory field). In some embodiments, the controller 50 is capable of prefiltering stored video data before review and further processing thereof.

In various embodiments, there is provided a video reviewing method including the steps of deriving at least two video segments from unedited video footage, displaying at least two video segments substantially concurrently and identifying video data of interest from at least one of said video segments.

In some embodiments, there is provided a video reviewing method including the steps of processing video footage using a saliency metric, deriving at least two video segments from the processed video footage, displaying at least two video segments substantially concurrently and identifying video data of interest from at least one of said video segments. Preferably, said video footage is unedited video footage.

In some embodiments, there is provided a video annotating method including the steps of deriving at least two video segments from video footage, displaying at least two video segments substantially concurrently and identifying video data of interest from at least one of said video segments. Preferably, said video footage is unedited video footage. Annotated video resulting from the video annotating method is a useful input to conventional processes for editing video footage.

In some embodiments, said video footage comprises video footage from more than one video camera.

In some embodiments, the process further include deriving one or more further video segments from said video data of interest. Furthermore, the some embodiments may display at least two of said further video segments substantially concurrently. In this way, the search for video data of interest can be progressively narrowed down, each time reducing the quantity of footage the user is required to review in order to find a particular event of interest.

In some embodiments, each of said video segments is displayed in a display window. If the unedited video footage was captured by a group of cameras, video segments from each of said group of cameras can be shown in different ones of said display windows. In other embodiments, a spatial relationship between at least two of said display windows indicates a temporal relationship between the video segments displayed therein. This gives the user a useful visual reminder of the temporal relationship between the video segments he/she is reviewing concurrently, which may improve his/her recall of the events which took place when he/she was recording the original footage. For example, the display windows 10 could be displayed temporally around a simulated clock face 20 (FIG. 5).

In some embodiments, the user's recall could further be improved by displaying the display windows 10 on a map 802 (FIG. 8). Such a map 802 could give reminders as to the locations 804 where footage was obtained or perhaps the sequence of events, if the wearer of the camera travelled from one location 804 to another which are represented on the map 802.

In some embodiments, the process may further label one or more of said display windows 10 (FIGS. 5, 6 and/or 8). Labels 30 could be preset (e.g. identifying individuals such as family members) or generated automatically (e.g. using a GPS system) and could show many attributes which would improve the user's recall of events.

In one embodiment, each of said display windows 10 is a monitor or screen. Separate monitors or screens could be used to display each video segment, so long as the monitors or screens are capable of being viewed concurrently.

In some embodiments, the process further includes allowing a user to selectively display said video data of interest. Alternatively, the process further includes automatically displaying video data of interest.

In some embodiments, the process further includes allowing a user to index one or more of said video segments forward or back by a predetermined time period.

In some embodiments, the process further includes allowing a user to index one or more of said video segments forward or back to an event having saliency above a predetermined saliency threshold.

In some embodiments, the process further includes causing one or more of said video segments to loop until said video data of interest is identified. This may be preferred when the video segments being concurrently displayed are not of equal length.

In some embodiments, the process further includes allowing a user to create one or more markers or beacons at any part of the footage, to facilitate subsequent searches over the same part of the footage. User-created beacons, at any desired point in the footage, greatly facilitate the user's review and may be used to bracket sections of the footage for subsequent closer review.

In some embodiments, one or more of said video segments is displayed in a fast forward mode, the rate of which is preferably controlled by the user.

In some embodiments, the rate at which the video segments are displayed can be controlled independently of one another.

In some embodiments, audio data relating to one or more of the concurrently displayed video segments is blended together and the blend is controllable by the user. Accordingly, the user can select which audio data to hear by selecting the relevant display window, audio data relating to the other display windows being temporarily suppressed. In alternative embodiments, control of audio data is driven by visual or auditory saliency and preferably said audio data is played so as to appear to come from a particular display window or spatial position, so that a spatial auditory cue is given to the user.

In some embodiments, selected parts of the audio data are played at an intelligible rate, possibly unsynchronised with the corresponding video segment. This is particularly useful when the video segment(s) are played at a fast forward rate.

In some embodiments, the process further includes pre-filtering the unedited video footage, before deriving said video segments, according to predefined selection parameters, which selection parameters can be interactively controlled by a user. Optionally, one of said predefined selection parameters is the identification of which one of a group of cameras captured the unedited video footage.

In some embodiments, meta data associated with said unedited video footage is processed during said pre-filtering step, before deriving said video segments. In this way, the quantity of video footage to be reviewed can be reduced, for example, by discarding that which does not meet the predefined selection parameters. The meta data associated with the pre-filtered video footage can be improved during the pre-filtering step, for example by creation of labels relating to a group of data which meets the selection parameters.

In some embodiments, there is provided apparatus comprising means to implement the method of any of the preceding paragraphs including a computing device or controller, a storage device, an input peripheral, for example a mouse or joystick, and a display device having a plurality of display windows. In other embodiments, the apparatus further includes an audio output peripheral, for example a loudspeaker or headphones.

In some embodiments, there is provided a computer program element comprising computer program code for implementing a method or apparatus of any of the preceding paragraphs.

In some embodiments, there is provided a computer program element comprising computer program code for deriving at least two video segments from unedited video footage, displaying at least two video segments substantially concurrently and, in response to a user-operable control, identifying video data of interest from at least one of said video segments.

In some embodiments, there is provided a computer program product comprising computer readable storage storing a computer program element as described in either of the preceding two paragraphs.

Figure 9:
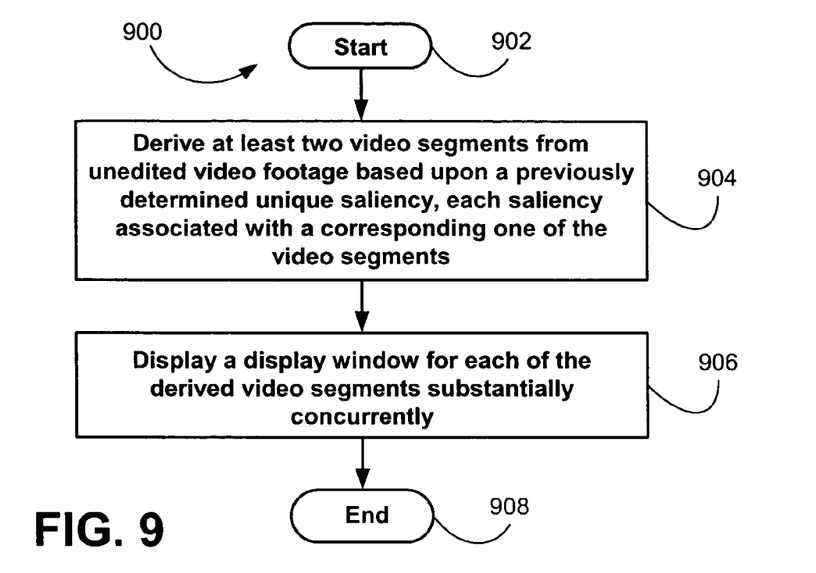
FIG. 9 is a flowchart illustrating an embodiment of a process for reviewing videos.
Figure 10:
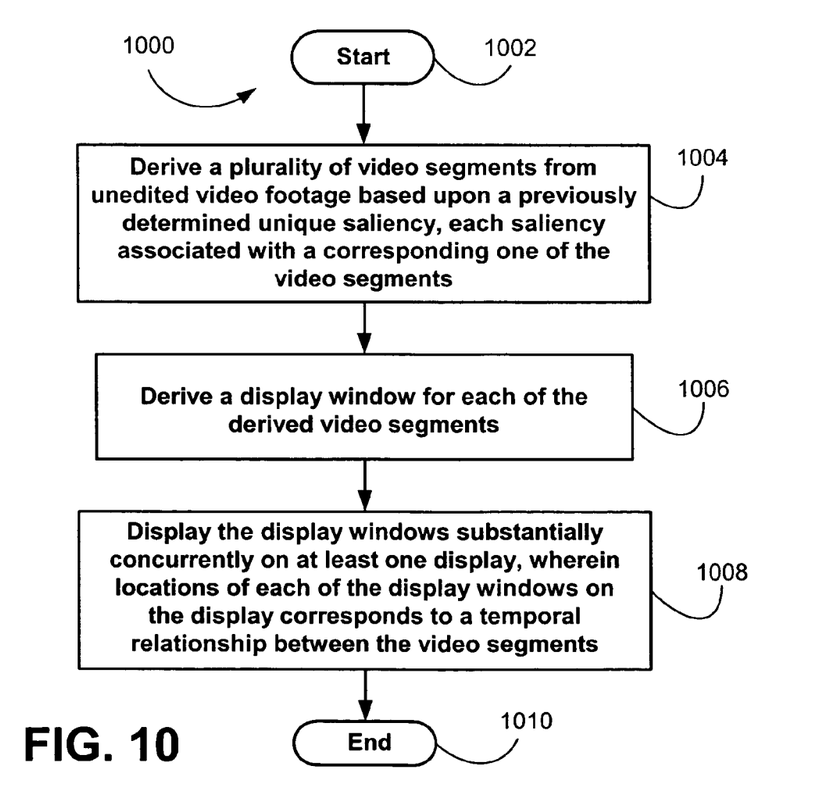
FIG. 10 is a flowchart illustrating another embodiment of a process for reviewing videos.

FIGS. 9 and 10 are flow charts 900 and 1000, respectively, illustrating an embodiment of a process for reviewing videos. The flow charts 900 and 1000 show the architecture, functionality, and operation of a possible implementation of the software for reviewing videos. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 9 and 10 or may include additional functions. For example, two blocks shown in succession in FIGS. 9 and 10 may in fact be executed substantially concurrently, the blocks may sometimes be executed in the reverse order, or some of the blocks may not be executed in all instances, depending upon the functionality involved, as further clarified herein. All such modifications and variations are intended to be included herein within the scope of this disclosure.

The process of flow chart 900 starts at block 902. At block 904, at least two video segments are derived from unedited video footage based upon a previously determined unique saliency, each saliency associated with a corresponding one of the video segments. At block 906, a display window for each of the derived video segments is displayed substantially concurrently. The process ends at block 908.

The process of flow chart 1000 starts at block 1002. At block 1004, a plurality of video segments is derived from unedited video footage based upon a previously determined unique saliency, each saliency associated with a corresponding one of the video segments. At block 1006, a display window for each of the derived video segments is derived. At block 1008, the display windows are displayed substantially concurrently on at least one display, wherein locations of each of the display windows on the display corresponds to a temporal relationship between the video segments. The process ends at block 1010.

What is claimed is:

1. A video reviewing method, comprising:
    processing unedited video footage using at least one saliency metric to identify which portions of the unedited video footage satisfy the at least one saliency metric;
    deriving at least two video segments from unedited video footage based upon the at least one saliency metric, wherein the at least two video segments satisfy the at least one saliency metric and correspond to different capture times of the unedited video footage; and
    displaying a display window for each of the derived video segments substantially concurrently and arranging the display windows in a spatial relationship with respect to each other that indicates a temporal relationship between the video segments.

2. The method of claim 1, further comprising:
    processing the unedited video footage based upon a previously determined unique saliency, each saliency associated with a corresponding one of the video segments; and
    deriving the video segments from the processed unedited video footage, wherein the displaying the display windows substantially concurrently is performed.

3. The method of claim 1, further comprising deriving the video segments from edited video footage, wherein the displaying the video segments substantially concurrently is performed.

4. The method of claim 1, further comprising:
    deriving at least one of the video segments from another video footage from another video camera; and
    displaying another display window for at least one other derived video segment substantially concurrently with the displayed display windows.

5. The method of claim 4, wherein the display windows derived from the video segments from each of a group of cameras are shown in different ones of the display windows.

6. The method of claim 1, further comprising:
    ordering indicated video data of interest from at least one of the video segments; and
    generating an edited video from the indicated ordered video segments.

7. The method of claim 1, further comprising displaying a selected one of the video segments.

8. The method of claim 1, further comprising displaying at least two of the selected video segments substantially concurrently.

9. The method of claim 1, further comprising labelling at least one of the display windows with a label.

10. The method of claim 1, further comprising labelling at least one of the display windows with a beacon.

11. The method of claim 1, further comprising displaying the display windows around a simulated clock face wherein an order of display of the display windows corresponds temporally with the clock face.

12. The method of claim 1, further comprising displaying the display windows on a map, wherein an order of display of the display windows corresponds to a location where the associated video segment was captured.

13. The method of claim 1, further comprising displaying at least one of the display windows on a second display.

14. The method of claim 1, further comprising allowing a user to selectively display video data of interest by selecting one of the display windows.

15. The method of claim 1, further comprising allowing a user to index one or more of the video segments forward or back by a predetermined time period.

16. The method of claim 1, further comprising allowing a user to index one or more of the video segments forward or back to an event having saliency above a predetermined saliency threshold.

17. The method of claim 1, further comprising causing one or more of the video segments to display as a loop until a video segment of interest is identified.

18. The method of claim 1, further comprising:
    creating at least one marker or beacon at any part of the unedited video footage; and
    deriving the video segments having the marker or beacon.

19. The method of claim 1, further comprising displaying in a fast forward mode at least one video segment.

20. The method of claim 19, further comprising displaying in the fast forward mode the video segment at a rate of controlled by a user.

21. The method of claim 19, further comprising displaying in the fast forward mode a plurality of video segments each at an independently controlled rate.

22. The method of claim 1, further comprising blending together the video segments associated with the displayed concurrently display windows.

23. The method of claim 22, further comprising blending together the video segments controllable by a user.

24. The method of claim 1, further comprising playing audio data associated with one of the display windows, wherein the audio data relating to the other display windows being temporarily suppressed.

25. The method of claim 24, wherein the audio data is associated with visual saliency.

26. The method of claim 24, wherein the audio data is associated with auditory saliency.

27. The method of claim 24, wherein the audio data is played so as to appear to come from a particular display window, so that a spatial auditory cue is given to a user.

28. The method of claim 27, wherein the audio data is played so as to appear to come from a particular spatial position associated with the display window.

29. The method of claim 1, further comprising pre-filtering the unedited video footage, before deriving the video segments, according to predefined selection parameters, wherein the predefined selection parameters can be interactively controlled by a user.

30. The method of claim 29, wherein at least one of the predefined selection parameters is an identification of one of a group of cameras that captured the unedited video footage.

31. The method of claim 1, further comprising:
receiving meta data associated with the unedited video footage; and
processing the unedited video footage during a pre-filtering, the pre-filtering performed before deriving the video segments.

32. The method of claim 1, further comprising receiving input from a user via device, the wherein the device comprises at least one selected from a group consisting of a computing device, a controller, a storage device, an input peripheral, a mouse, a joystick, and a display device having a plurality of display windows.

33. The method of claim 1, further comprising generating an edited video footage based upon the video segments.

34. The method of claim 1, further comprising storing edited video footage.

35. The method of claim 1, further comprising;
selecting at least two of the video segments;
combining the selected video segments into another video segment; and
displaying another display window for the other video segment.

36. A video reviewing method, comprising:
processing unedited video footage using a plurality of saliency metrics to identify which portions of the unedited video footage satisfy the plurality of saliency metrics;
deriving a plurality of video segments from the unedited video footage based upon the plurality of saliency metrics, wherein each of the plurality of saliency metrics is associated with a corresponding one of the video segments, and wherein the plurality of video segments correspond to different capture times of the unedited video footage;
deriving a display window for each of the derived video segments;
displaying the display windows substantially concurrently on at least one display, wherein locations of each of the display windows on the display corresponds to a temporal relationship between the video segments.

37. The method of claim 36, further comprising displaying the display windows around a simulated clock face wherein an order of display of the display windows corresponds temporally with the clock face.

38. The method of claim 36, further comprising:
displaying the display windows on a map, wherein the order of display of the display windows corresponds to a location where the associated video segment was captured; and displaying a label with each of the display windows, the label corresponding to the temporal relationship between the video segments.

39. A non-transitory computer-readable storage medium having computer readable program code stored therein for causing an apparatus to perform a method for reviewing unedited video footage the computer-readable program code comprising logic to perform: processing the unedited video footage using at least one saliency metric to identify which portions of the unedited video footage satisfy the at least one saliency metric; deriving at least two video segments from the unedited video footage based upon the at least one saliency metric, wherein the at least two video segments satisfy the at least one saliency metric and correspond to different capture times of the unedited video footage; displaying a display window for each of the derived video segments substantially concurrently; and arranging the display windows in a spatial relationship with respect to each other that indicates a temporal relationship between the video segments.

40. The non-transitory computer-readable storage medium of claim 39, further comprising logic to perform deriving the video segments from the unedited video footage, displaying the segments substantially concurrently and, in response to a user-operable control, identifying video data of interest from at least one of the video segments.

41. The non-transitory computer-readable storage medium of claim 39, further comprising logic to perform storing an edited video footage based upon the video segments.

42. A system for reviewing unedited video footage, comprising: a processor configured to process the unedited video footage using at least one saliency metric to identify which portions of the unedited video footage satisfy the at least one saliency metric, configured to derive a plurality of video segments from the processed unedited video footage based upon the at least one saliency metric, wherein the plurality of video segments satisfy the at least one saliency metric and correspond to different capture times of the unedited video footage, and configured to generate data for displaying the plurality of video segments as a plurality of display windows; a memory from which the unedited video footage is stored for access by the processor; and a display configured to substantially concurrently display the plurality of display windows, wherein locations of each of the display windows on the display corresponds to a temporal relationship between the video segments.

43. The system of claim 42, wherein the processor is further configured to generate an edited video footage based upon the video segments.

44. The system of claim 43, wherein the processor is further configured to store in the memory the edited video footage.

45. The system of claim 42, further comprising another display configured to display at least one other display window selected from the display windows.

* * * * *

UNITED STATES PATENT AND TRADEMARK OFFICE
CERTIFICATE OF CORRECTION

| | | |
|---|---|---|
| PATENT NO. | : 7,873,258 B2 | Page 1 of 1 |
| APPLICATION NO. | : 10/894617 | |
| DATED | : January 18, 2011 | |
| INVENTOR(S) | : David Arthur Grosvenor | |

It is certified that error appears in the above-identified patent and that said Letters Patent is hereby corrected as shown below:

In column 11, line 38, in Claim 2, delete "a" and insert -- at least one --, therefor.

In column 11, line 39, in Claim 2, after "determined" delete "unique".

In column 13, line 8, in Claim 32, before "wherein" delete "the".

In column 14, line 2, in Claim 39, delete "computer readable"' and insert -- computer-readable --, therefor.

In column 14, line 4, in Claim 39, delete "footage" and insert -- footage. --, therefor.

In column 14, line 12, in Claim 39, delete "footage; displaying" and insert -- footage; and displaying --, therefor.

Signed and Sealed this
Seventeenth Day of April, 2012

David J. Kappos
*Director of the United States Patent and Trademark Office*